US008495586B2

(12) United States Patent
Zeidman

(10) Patent No.: US 8,495,586 B2
(45) Date of Patent: Jul. 23, 2013

(54) SOFTWARE FOR FILTERING THE RESULTS OF A SOFTWARE SOURCE CODE COMPARISON

(75) Inventor: Robert Marc Zeidman, Cupertino, CA (US)

(73) Assignee: Software Analysis and Forensic Engineering, Cupertino, CA (US)

( * ) Notice: Subject to any disclaimer, the term of this patent is extended or adjusted under 35 U.S.C. 154(b) by 1468 days.

(21) Appl. No.: 11/467,155

(22) Filed: Aug. 24, 2006

(65) Prior Publication Data

US 2008/0052662 A1 Feb. 28, 2008

(51) Int. Cl.
*G06F 9/44* (2006.01)

(52) U.S. Cl.
USPC ........... 717/128; 717/121; 717/126; 717/127; 717/130; 717/131; 726/23; 726/24; 726/25; 726/28; 726/33

(58) Field of Classification Search
None
See application file for complete search history.

(56) References Cited

U.S. PATENT DOCUMENTS 6,138,270 A * 10/2000 Hsu ............................... 717/125
6,976,170 B1 * 12/2005 Kelly ............................ 713/181
7,698,287 B2 * 4/2010 Becker et al. .......... 707/999.101
2002/0016953 A1 * 2/2002 Sollich .............................. 717/1
2002/0147867 A1 * 10/2002 Satlow .......................... 710/100
2005/0055369 A1 * 3/2005 Gorelik et al. ................ 707/102
2006/0005166 A1 * 1/2006 Atkin et al. ................... 717/120
2009/0144702 A1 * 6/2009 Atkin et al. ................... 717/121
2010/0169267 A1 * 7/2010 John et al. ..................... 707/605

OTHER PUBLICATIONS

Matt G. Ellis et al., "Plagiarism Detection in Computer Code", Mar. 23, 2005, pp. 1-10.*
Seo-Young Noh et al., "An XML Plagiarism Detection Model for Procedural Programming Languages", 2003, pp. 1-12.*
Chao Liu et al., GPLAG: Detection of Software Plagiarism by Program Dependence Graph Analysis, Aug. 20-23, 2006, pp. 1-10.*
Lefteris Moussiades et al., "PDetect: A clustering Approach for Detecting Plagiarism in Source Code Datasets", Jun. 15, 2004, pp. 1-11.*
South Bank University "Effective and Efficient Plagiarism Detection", 2003, pp. 1-112.*
Andrew Granville, "Detecting Plagiarism in Java Code", 2002, pp. 1-47.*

* cited by examiner

*Primary Examiner* — Isaac Tecklu
(74) *Attorney, Agent, or Firm* — Benjamin Kimes

(57) ABSTRACT

A software tool allows a user to filter out the results produced by a software source code correlation program that is executed on sets of software source code files. The tool allows the user to discard elements of source code that are not relevant to the analysis without requiring the user to run the correlation program multiple times.

22 Claims, 11 Drawing Sheets

```
/*   ---- begin    routine ----   */
void fdiv(
    char    *fname,      // file name
    char *path)          // path
{
    int Index1, j;

    while (1)
        j =    strlen(fname);
    /* find the file     extension */
```

101

(a) C source code snippet for file 1.

102

```
Statements1[0] = ""                 Comments1[0] = "---- begin routine ----"
Statements1[1] = "void fdiv"        Comments1[1] = ""
Statements1[2] = "char fname"       Comments1[2] = "file name"
Statements1[3] = "char path"        Comments1[3] = "path"
Statements1[4] = ""                 Comments1[4] = ""
Statements1[5] = "int Index1 j"     Comments1[5] = ""
Statements1[6] = ""                 Comments1[6] = ""
Statements1[7] = "while 1"          Comments1[7] = ""
Statements1[8] = "j strlen fname"   Comments1[8] = ""
Statements1[9] = ""                 Comments1[9] = "find the file extension"
```

(b) Statement and comment arrays for file 1.

```
Identifier1[0] = "fdiv"
Identifier1[1] = "fname"
Identifier1[2] = "path"
Identifier1[3] = "Index1"
```

103

(c) Array of unique identifiers (non-keywords) in file 1.

Figure 1

```
            File 1                              File 2
1   /* ---- begin routine ---- */    1   /* find the file extension */
2   void fdiv(                       2   void file_divide(
3       char *fname, // file name    3     char      *fname,
4       char *path)   /* path */     4     char      *path)
5   {                                5   {
6       int Index1, j;               6     int i, j;
7                                    7     while (1)     // loop here
8       while (1)                    8       j = strlen(fname);
9           j = strlen(fname);       9
10  // find the file extension       10
```
(a) Two files.                                                    ⎤ 201

```
            3/3
            4/4
            9/8
```
(b) Matching source lines in file1/file2                          ⎤ 202

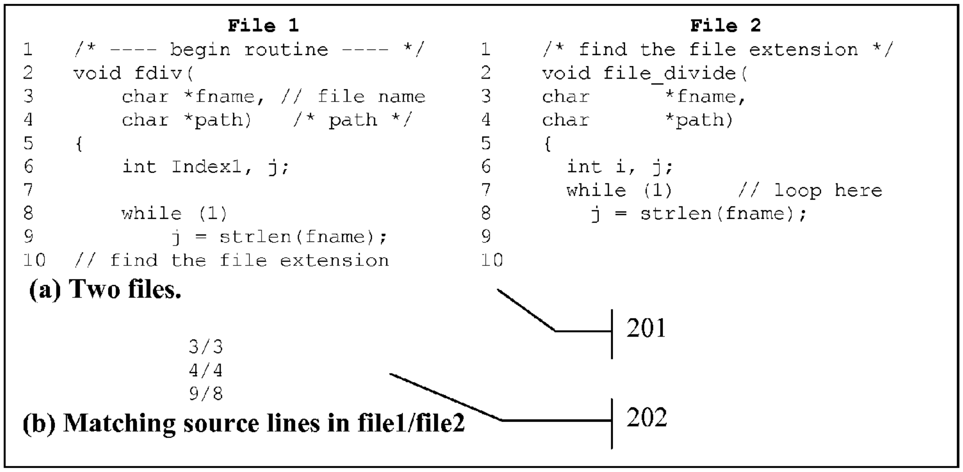

Figure 2

```
            File 1                              File 2
1   /* ---- begin routine ---- */    1   /* find the file extension */
2   void fdiv(                       2   void file_divide(
3       char *fname, // file name    3     char      *fname,
4       char *path)   /* path */     4     char      *path)    // path
5   {                                5   {
6       int Index1, j;               6     int i, j; /* ---- begin routine ---- */
7                                    7     while (1)     // loop here
8       while (1)                    8       j = strlen(fname);
9           j = strlen(fname);       9
10  // find the file extension       10    switch (x)
11      if (x == 5) {                11   {
```
(a) Two files.                                                    ⎤ 301

```
            1/6
            4/4
            10/1
```
(b) Matching comment lines in file1/file2                         ⎤ 302

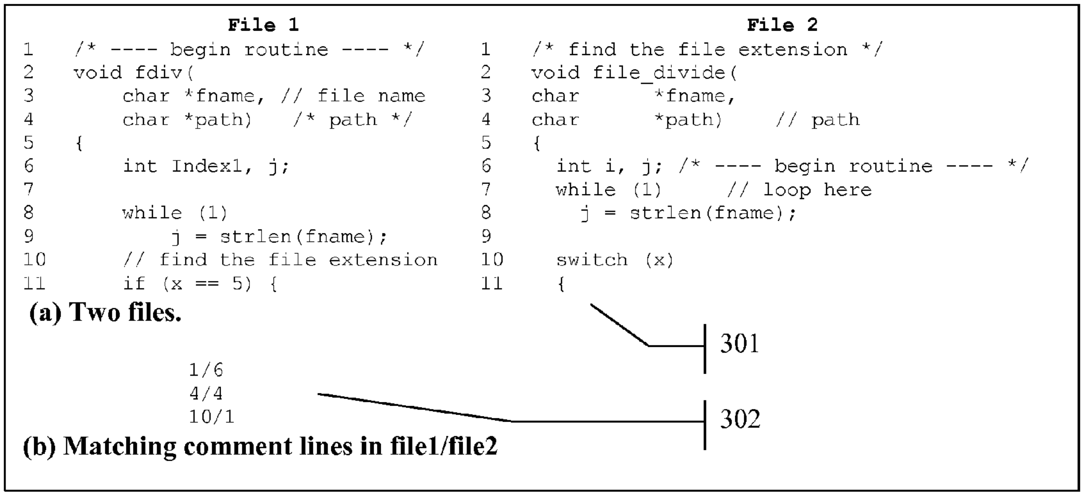

Figure 3

```
Identifiers1[0] = "abc"     Identifiers2[0] = "Aabc"
Identifiers1[1] = "abc1"    Identifiers2[1] = "aBc"
Identifiers1[2] = "abc123"  Identifiers2[2] =
                            "abc1111111"
Identifiers1[3] = "abcdef"  Identifiers2[3] = "abcXXXyz"
Identifiers1[4] = "pdq"     Identifiers2[4] = "i"
Identifiers1[5] = "xxx"     Identifiers2[5] = "j"
Identifiers1[6] = "xyz"     Identifiers2[6] = "pdq"
Identifiers1[7] = "yyy"     Identifiers2[7] = "X"
```

401

(a) Identifiers in files 1 and 2.

```
PartialIdentifiers[0] = "abc"
PartialIdentifiers[1] = "abc1"
PartialIdentifiers[2] = "xxx"
PartialIdentifiers[3] = "xyz"
```

402

(b) Matching partial identifiers

Figure 4

```
<Program>CodeMatch
<Version>5.0.0                                          601
<Date>7/5/2006
<Time>23:08:04

<IDWeight>4
<PIDWeight>2
<StatementWeight>10                                     602
<CommentWeight>10
<MaxSequenceWeight>100

<Folder1>D:\test\C\files 1
<Folder2>D:\test\C\files 2                              603
<Language>C++
<FileType>*.cpp;*.c;*.hpp;*.h

<Algorithm>Identifier Matching
<Algorithm>Partial Identifier Matching
<Algorithm>Statement Matching                           604
<Algorithm>Comment Matching
<Algorithm>Sequence Matching

<Dir1>D:\test\C\files 1
<Dir2>D:\test\C\files 2                                 605
<File1>aaa.c
<File2>bbb.cpp

<IDs>
<ID>aux b1 dump happy123 image IsWin95 len nPlatformVersion
<ID>private program String TelePhone tran two xxx       606
</IDs>

<PIDs>
<PID>happy Index xyz                                    607
</PIDs>

<Statements>
<Line>p = null;
<Lines1>10 17 262
<Lines2>33 34 119 221                                   608
<Line>for (i = 0; i < TheEndVal; i++)
<Lines1>23
<Lines2>67
</Statements>

<Comments>
<Line>* Copyright (c) 1992, 1993, 1994, 1995, 1996
<Lines1>5 7 9                                           609
<Lines2>2 44 888
</Comments>

<Sequences>
<Seq>1 1 10                                             610
<Seq>17 31 21
</Sequences>

<Score>206                                              611
```

Figure 6

```
<Identifier>bit32
<Identifier>dump
<Identifier>image                                              ─── 701
<Identifier>program
<Identifier>nPlatformVersion
<Identifier>IsWin95

<Statement>#include <Assert.h>
<Statement>#include <RegStr.h>
<Statement>#include <Stdio.h>                                  ─── 702
<Statement>#include <TChar.h>
<Statement>p = null;
<Statement>PW32N_ADAPTER_INFO pAdapterInfo,

<Comment>#include "WiNDIS.h"
<Comment>* Copyright (c) 1992, 1993, 1994, 1995, 1996
<Comment>* THIS SOFTWARE IS PROVIDED AS IS                     ─── 703
<Comment>printf("%u %u %u\n", insn->code,

<File>*\aaa.c
<File>*\bpf_image2.c
<File>D:\test\C\files 1\bpf_image.c                            ─── 704
<File>D:\test\C\files 2\test\W32NReg.c
<File>D:\test\C\files 1\test\*

<NoSequences>                                                  ─── 705

<Parameter>MinScore 100                                        ─── 706
<Parameter>MaxScore 500
```

Figure 7

```
<Program>CodeMatch
<Version>5.0.0                                        901
<Date>7/5/2006
<Time>23:08:04

<IDWeight>4
<PIDWeight>2
<StatementWeight>10                                   902
<CommentWeight>10
<MaxSequenceWeight>100

<Folder1>D:\test\C\files 1
<Folder2>D:\test\C\files 2                            903
<Language>C++
<FileType>*.cpp;*.c;*.hpp;*.h

<Algorithm>Identifier Matching
<Algorithm>Partial Identifier Matching
<Algorithm>Statement Matching                         904
<Algorithm>Comment Matching
<Algorithm>Sequence Matching

<Dir1>D:\test\C\files 1
<Dir2>D:\test\C\files 2                               905
<File1>aaa.c
<File2>bbb.cpp

<IDs>
<ID>aux b1 happy123 len
<ID>private String TelePhone tran_two xxx             906
</IDs>

<PIDs>
<PID>happy Index xyz                                  907
</PIDs>

<Statements>
<Line>p = null;
<Lines1>10 17 262
<Lines2>33 34 119 221                                 908
<Line>for (i = 0; i < TheEndVal; i++)
<Lines1>23
<Lines2>67
</Statements>

<Comments>
<Line>* Copyright (c) 1992, 1993, 1994, 1995, 1996
<Lines1>5 7 9                                         909
<Lines2>2 44 888
</Comments>

<Sequences>
<Seq>1 1 10                                           910
</Sequences>
                                                      911
<Score>186
```

Figure 9

```
<Program>CodeMatch
<Version>5.0.0                                              1001
<Date>7/5/2006
<Time>23:08:04

<IDWeight>4
<PIDWeight>2
<StatementWeight>10                                         1002
<CommentWeight>10
<MaxSequenceWeight>100

<Folder1>D:\test\C\files 1
<Folder2>D:\test\C\files 2                                  1003
<Language>C++
<FileType>*.cpp;*.c;*.hpp;*.h

<Algorithm>Identifier Matching
<Algorithm>Partial Identifier Matching
<Algorithm>Statement Matching                               1004
<Algorithm>Comment Matching
<Algorithm>Sequence Matching

<Dir1>D:\test\C\files 1
<Dir2>D:\test\C\files 2                                     1005
<File1>aaa.c
<File2>bbb.cpp

<IDs>
<ID>aux b1 dump happy123 image IsWin95 len nPlatformVersion
<ID>private program String TelePhone tran two xxx           1006
</IDs>

<PIDs>
<PID>happy Index xyz                                        1007
</PIDs>

<Statements>
<Line>for (i = 0; i < TheEndVal; i++)
<Lines1>23                                                  1008
<Lines2>67
</Statements>

<Comments>
<Line>* Copyright (c) 1992, 1993, 1994, 1995, 1996
<Lines1>5 7 9                                               1009
<Lines2>2 44 888
</Comments>

<Sequences>
<Seq>1 1 10                                                 1010
</Sequences>

<Score>136                                                  1011
```

Figure 10

```
<Program>CodeMatch
<Version>5.0.0                                                  1101
<Date>7/5/2006
<Time>23:08:04

<IDWeight>4
<PIDWeight>2
<StatementWeight>10                                             1102
<CommentWeight>10
<MaxSequenceWeight>100

<Folder1>D:\test\C\files 1
<Folder2>D:\test\C\files 2                                      1103
<Language>C++
<FileType>*.cpp;*.c;*.hpp;*.h

<Algorithm>Identifier Matching
<Algorithm>Partial Identifier Matching
<Algorithm>Statement Matching                                   1104
<Algorithm>Comment Matching
<Algorithm>Sequence Matching

<Dir1>D:\test\C\files 1
<Dir2>D:\test\C\files 2                                         1105
<File1>aaa.c
<File2>bbb.cpp

<IDs>
<ID>aux b1 dump happy123 image IsWin95 len nPlatformVersion
<ID>private program String TelePhone tran two xxx               1106
</IDs>

<PIDs>
<PID>happy Index xyz                                            1107
</PIDs>

<Statements>
<Line>p = null;
<Lines1>10 17 262
<Lines2>33 34 119 221                                           1108
<Line>for (i = 0; i < TheEndVal; i++)
<Lines1>23
<Lines2>67
</Statements>

<Comments>                                                      1109
</Comments>

<Sequences>
<Seq>1 1 10                                                     1110
</Sequences>

<Score>146                                                      1111
```

Figure 11

```
<Program>CodeMatch
<Version>5.0.0                                          1201
<Date>7/5/2006
<Time>23:08:04

<IDWeight>4
<PIDWeight>2
<StatementWeight>10                                     1202
<CommentWeight>10
<MaxSequenceWeight>100

<Folder1>D:\test\C\files 1
<Folder2>D:\test\C\files 2                              1203
<Language>C++
<FileType>*.cpp;*.c;*.hpp;*.h

<Algorithm>Identifier Matching
<Algorithm>Partial Identifier Matching
<Algorithm>Statement Matching                           1204
<Algorithm>Comment Matching
<Algorithm>Sequence Matching

<Dir1>D:\test\C\files 1
<Dir2>D:\test\C\files 2                                 1205
<File1>aaa.c
<File2>bbb.cpp

<IDs>
<ID>aux b1 dump happy123 image IsWin95 len nPlatformVersion
<ID>private program String TelePhone tran two xxx       1206
</IDs>

<PIDs>
<PID>happy Index xyz                                    1207
</PIDs>

<Statements>
<Line>p = null;
<Lines1>10 17 262
<Lines2>33 34 119 221                                   1208
<Line>for (i = 0; i < TheEndVal; i++)
<Lines1>23
<Lines2>67
</Statements>

<Comments>
<Line>* Copyright (c) 1992, 1993, 1994, 1995, 1996
<Lines1>5 7 9                                           1209
<Lines2>2 44 888
</Comments>

<Score>206                                              1210
```

Figure 12

SOFTWARE FOR FILTERING THE RESULTS OF A SOFTWARE SOURCE CODE COMPARISON

BACKGROUND OF THE INVENTION

1. Field of the Invention

The present invention relates to software tools for comparing program source code files to determine the amount of similarity, or "correlation," between the files and to pinpoint specific sections that are similar. In particular, the present invention relates to improving the analysis and interpretation of the results of a source code comparison by filtering out elements that are irrelevant to the comparison.

2. Discussion of the Related Art

Programs and algorithms that determine software source code correlation have been around for a number of years but have gotten more attention recently due to two main reasons. One reason is that the Internet and search engines like Google have made source code very easy to obtain. Another reason is the growing open source movement that allows programmers all over the world to write, distribute, and share code. It follows that programs that determine software source code correlation have become more sophisticated in recent years. It also follows that the amount of code to be compared has grown larger, especially as software projects have grown larger.

Finding a correlation between different sets of source code does not necessarily imply that illicit behavior occurred. There can be correlation between programs for a number of reasons as enumerated below.

Third-Party Source Code. It is possible that widely available open source code is used in both programs. Also, libraries of source code can be purchased from third-party vendors.

Code Generation Tools. Automatic code generation tools generate software source code using similar or identical identifiers for variables, classes, methods, and properties. Also, the structure of the code generated by these tools tends to fit into a certain template with an identifiable pattern.

Commonly Used Identifier Names. Certain identifier names are commonly taught in schools or commonly used by programmers in certain industries. For example, the identifier "result" is often used to hold the result of an operation.

Common Algorithms. Certain algorithms are most easily implemented using a certain sequence of statements in a particular programming language. Commonly used algorithms, such as for elementary functions, will often be coded in very similar ways and may have a high degree of correlation even though there was no direct contact between the authors.

Common Author. It is possible that one programmer will create two programs that have correlations simply because the programmer tends to use certain identifiers and tends to write code in a certain way.

Plagiarism. Code was copied from one program to another.

When a correlation program is run on sets of source code, often the user is looking to find one specific kind of correlation. For example, if the user is looking to find correlation due to plagiarism, he wants to eliminate the other five sources of correlation. The specific reasons for correlation can often not be determined until after a correlation program has been run and the results analyzed. At that time, it would be useful to be able to filter out correlation results due to forms of correlation that are not relevant. The present invention is a tool for doing just that.

SUMMARY OF THE INVENTION

The present invention provides a software tool for allowing a user to filter out the results of a software source code correlation program that has been executed on sets of software source code files. The tool allows the user to discard aspects of correlation that are not relevant to the analysis without requiring the user to run the correlation program multiple times.

Further features and advantages of various embodiments of the present invention are described in the detailed description below, which is given by way of example only.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

FIG. 1 illustrates a process for dividing a source code file into statements, comments, and identifiers.

FIG. 2 shows matching statements in a pair of source code files.

FIG. 3 shows matching comments in a pair of source code files.

FIG. 4 shows partially matching identifiers in a pair of source code files.

FIG. 6 shows a correlation database.

FIG. 7 shows a filter file.

FIG. 9 shows a correlation database file that has been filtered for identifiers.

FIG. 10 shows a correlation database file that has been filtered for statements.

FIG. 11 shows a correlation database file that has been filtered for comments.

FIG. 12 shows a correlation database file that has been filtered for instruction sequences.

DETAILED DESCRIPTION

Figure 5:
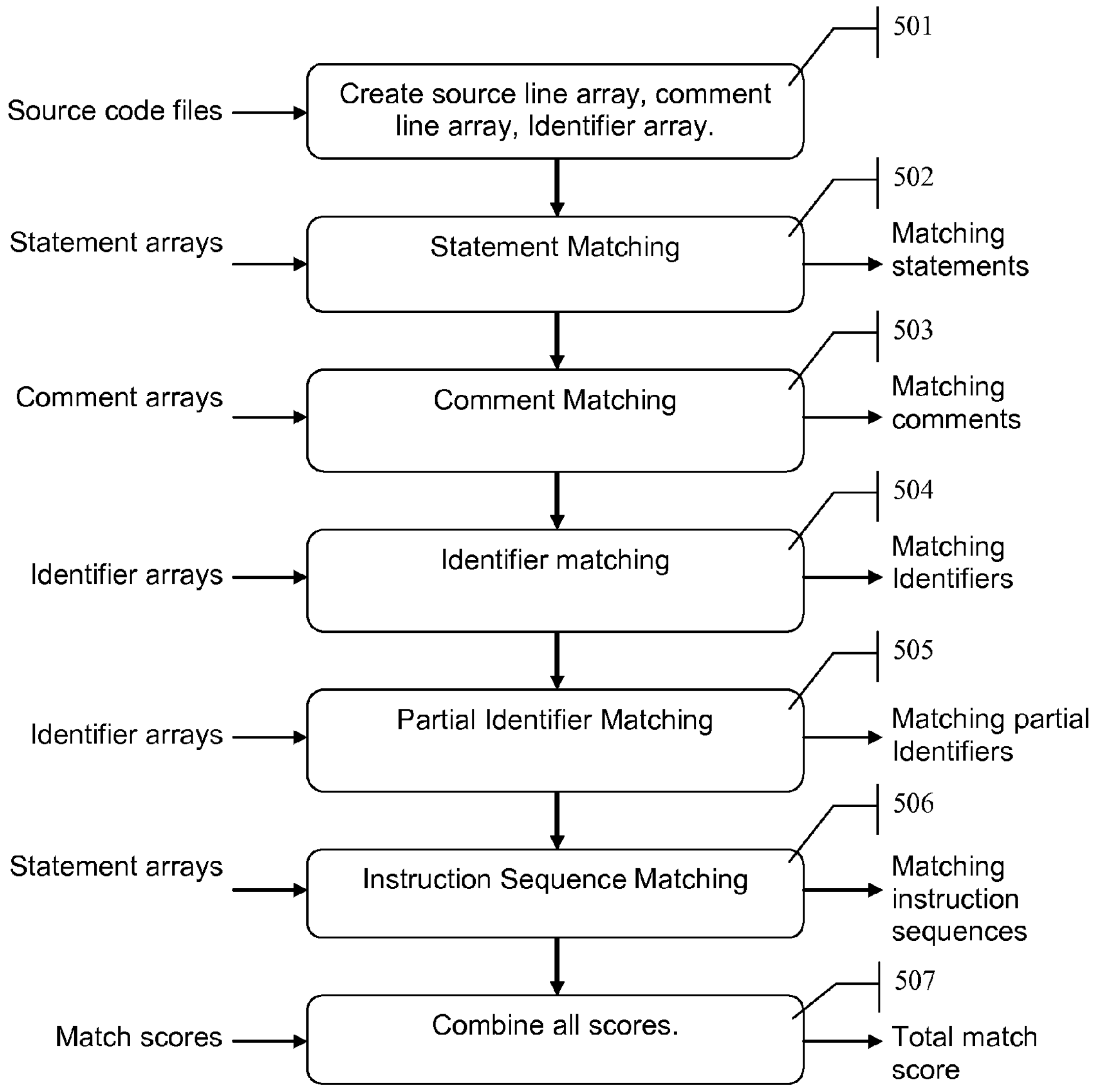
FIG. 5 illustrates a sequence of algorithms for determining source code correlation.

The present invention will be understood more fully from the detailed description given below and from the accompanying drawings of the preferred embodiments of the invention, which, however, should not be taken to limit the invention to the specific embodiments but are for explanation and understanding only.

A well-known software source code correlation program called CodeMatch™ uses five algorithms to find plagiarism: Statement Matching, Comment Matching, Identifier Matching, Partial Identifier Matching, and Instruction Sequence Matching. Before any of the algorithm processing takes place, some preprocessing is done to create string arrays. Each file is represented by three arrays—an array of statements that consists of lines of functional source code and does not include comments, an array of comments that does not include functional source code, and an array of identifiers found in the source code. Identifiers include variable names, constant names, function names, and any other words that are not keywords of the programming language.

Each line of each file is initially examined and two string arrays for each file are created: Statements1[ ], Comments1[ ] and Statements2[ ], Comments2[ ] are the statements and comments string arrays for file 1 and file 2 respectively. Examples of these arrays are shown for a sample code snippet in FIG. 1. A sample snippet of a source code file to be examined is shown in part (a) 101. The separation of statements and comments for the code snippet is shown in part (b) 102.

Next the statements are examined from each file to obtain a list of all identifiers in the source code that are not programming language keywords, as shown in part (c) 103 of FIG. 1. Note that identifier j is not listed as an identifier because all 1-character identifier are ignored as too common to consider.

The "statement matching" algorithm compares each functional statement of source code from each file against functional statements in the other file or files. FIG. 2 illustrates this algorithm. Part (a) 201 shows the lines of two files along with line numbers. Part (b) 202 shows the statement line numbers in the two files that are considered matching.

The "comment matching" algorithm similarly compares each line of comments from each file against comments in the other file or files. FIG. 3 shows two files along with line numbers and the comments that are considered matching. Part (a) 301 shows the lines of two files along with line numbers. Part (b) 302 shows the comment line numbers in the two files that are considered matching.

The "identifier matching" algorithm counts the number of matching identifiers—identifiers being words that are not programming language keywords.

The "partial identifier matching" algorithm examines each identifier in the source code of one file of a file pair and finds all words that include the identifier as a substring in the other file of a file pair. This algorithm is illustrated in FIG. 4. In part (a) 401, the identifiers from the two files are displayed. In part (b) 402, every identifier from one file that can be found as a sequence within an identifier from the other file is listed. So the identifier "abc" in file 1 can be found within identifiers "aabc", "abc1111111", and "abcxxxyz" in file 2.

The "instruction sequence matching" algorithm compares the first word of every statement in the pair of files. This algorithm finds sequences of code that appear to perform the same functions despite changed comments and identifier names. The algorithm determines the longest matching instruction sequence within both files. Look at the example code in FIG. 3 part (a) 301. In this case, the instruction sequence of lines 2 through 9 in file 1 matches the instruction sequence of lines 2 through 8 in file 2 because the first word in each non-blank line in file 1 is identical to the first word of the corresponding line in file 2. There are 6 statements in this sequence, so the algorithm yields a value of 6. If a longer sequence of statements is found in the file, this algorithm returns the number of statements in the longer sequence.

The entire correlation algorithm, applying all five algorithms, is shown in FIG. 5. In the first step 501, the statement, comment, and identifier arrays for the two files are created. In the second step 502, the statement arrays of the two files are compared using the statement matching algorithm. In the third step 503, the comment arrays of the two files are compared using the comment matching algorithm. In the fourth step 504, the identifier arrays of the two files are compared using the identifier matching algorithm. In the fifth step 505, the identifier arrays of the two files are compared using the partial identifier matching algorithm. In the sixth step 506, the statement arrays of the two files are compared using the instruction sequence matching algorithm. Although all matching algorithms produce output for the user, in the seventh step 507, the results of all matching algorithms are combined into a single correlation score.

The correlation score t is a measure of the similarity of the file pairs. A higher score means higher correlation. This score is given by the following equation.

$$t=k_w+w+k_pp+k_ss+k_cc+k_qq$$

where w is the number of matching identifiers in the source code of the pair of files, p is the number of partially matching identifiers in the source code of the pair of files, s is the number of matching statements in the pair of files, c is the number of matching comments in the pair of files, and q is the number of lines in the longest matching instruction sequence in the pair of files, and where $k_w$ is a weight given to the number of matching identifiers in the source code of the pair of files, $k_p$ is a weight given to the number of partially matching identifiers in the source code of the pair of files, $k_s$ is a weight given to the number of matching statements in the pair of files, $k_c$ is a weight given to the number of matching comments in the pair of files, and $k_q$ is a weight given to the number of lines in the longest matching instruction sequence in the pair of files.

The weights $k_w$, $k_p$, $k_s$, $k_c$, and $k_q$ may be dependent on other factors such as the length or type of the identifiers, statements, comments, or sequences.

The output of the correlation detection program is a correlation database file as shown in FIG. 6. The first section 601 of the database file specifies the name of the correlation program, the program version, and the date and time that the program began execution.

The next section of the database file 602 specifies the weights given to the results of each of the five algorithms. In the example, $k_w$=4 as specified by the tag <IDWeight>, $k_p$=2 as specified by the tag <PIDWeight>, $k_s$=10 as specified by the tag <StatementWeight>

$k_c$=10 as specified by the tag <CommentWeight>, and $k_q$=100 as specified by the tag <MaxSequenceWeight>.

The next section 603 of the database file specifies the two folders containing the source code files that are being compared, the programming language of the source code files, and the source code file name types.

The next section 604 of the database file specifies the different algorithms being used in the comparison.

The next section 605 of the database file specifies the directory and file name for each of the two source code files being compared.

The next section 606 of the database file shows the matching identifiers that were found in the two files. The <ID> tag specifies the beginning of the list of matching identifiers. The </ID> tag specifies the end of the list of matching identifiers. The identifiers are listed on the lines beginning with the <ID> tag. In the example, the identifiers "aux," "b1," "dump," "happy123," "image," "IsWin95," "len," "nPlatformVersion," "private," "program," "String," "TelePhone," "tran_two," and "xxx" were found in both files.

The next section 607 of the database file shows the partially matching identifiers that were found in the two files. The <PID> tag specifies the beginning of the list of partially matching identifiers. The </PID> tag specifies the end of the list of partially matching identifiers. The partially matching identifiers are listed on the lines beginning with the <PID> tag.

The next section 608 of the database file shows the matching statements that were found in the two files. The <Statements> tag specifies the beginning of the list of matching statements. The </Statements> tag specifies the end of the list of matching statements. The <Line> tag specifies the actual statement that was found in both files. The <Lines1> tag specifies the line numbers in the first file where this statement was found. The <Lines2> tag specifies the line numbers in the second file where this statement was found.

The next section 609 of the database file shows the matching comments that were found in the two files. The <Comments> tag specifies the beginning of the list of matching comments. The </Comments> tag specifies the end of the list of matching comments. The <Line> tag specifies the actual comment that was found in both files. The <Lines1> tag specifies the line numbers in the first file where this comments was found. The <Lines2> tag specifies the line numbers in the second file where this comments was found.

The next section 610 of the database file shows the matching instruction sequences that were found in the two files. The <Sequences> tag specifies the beginning of the list of matching instruction sequences. The </Sequences> tag specifies the end of the list of matching instruction sequences. The <Seq> tag specifies the actual sequences that was found in both files. The first number is the line number of the beginning of the sequence in the first file. The second number is the line number of the beginning of the sequence in the second file. The third number is the number of matching lines in the sequence.

The next section 611 shows the correlation score t of the two files. Sections 605 through 611 are repeated for each pair of files that have been compared.

A post-process filter file is shown in FIG. 7. Section 701 of the filter file specifies the identifiers to be filtered out of the correlation database file. Each identifier is preceded by the <Identifier> tag.

The next section 702 of the filter file specifies the statements to be filtered out of the correlation database file. Each instruction is preceded by the <Statement> tag.

The next section 703 of the filter file specifies the comments to be filtered out of the correlation database file. Each comment is preceded by the <Comment> tag.

The next section 704 of the filter file specifies the files to be filtered out of the correlation database file. Each file name with its full path is preceded by the <File> tag. The file name and path name can include wildcard characters such as *, in order to filter out entire sets of files with the same name in different folders or all files within a particular folder.

The next section 705 of the filter file specifies whether instruction sequences should be filtered out. The tag <NoSequences> causes all instruction sequences to be filtered out. If there were no tag in this section, no instruction sequences would be filtered out.

The next section 706 of the filter file includes various other parameters that can be applied to the correlation database file. In this example, the minimum correlation score is specified as 100 while the maximum correlation score is specified as 500. All file pairs that do not fall within this range will be filtered out of the correlation database file.

Figure 8:
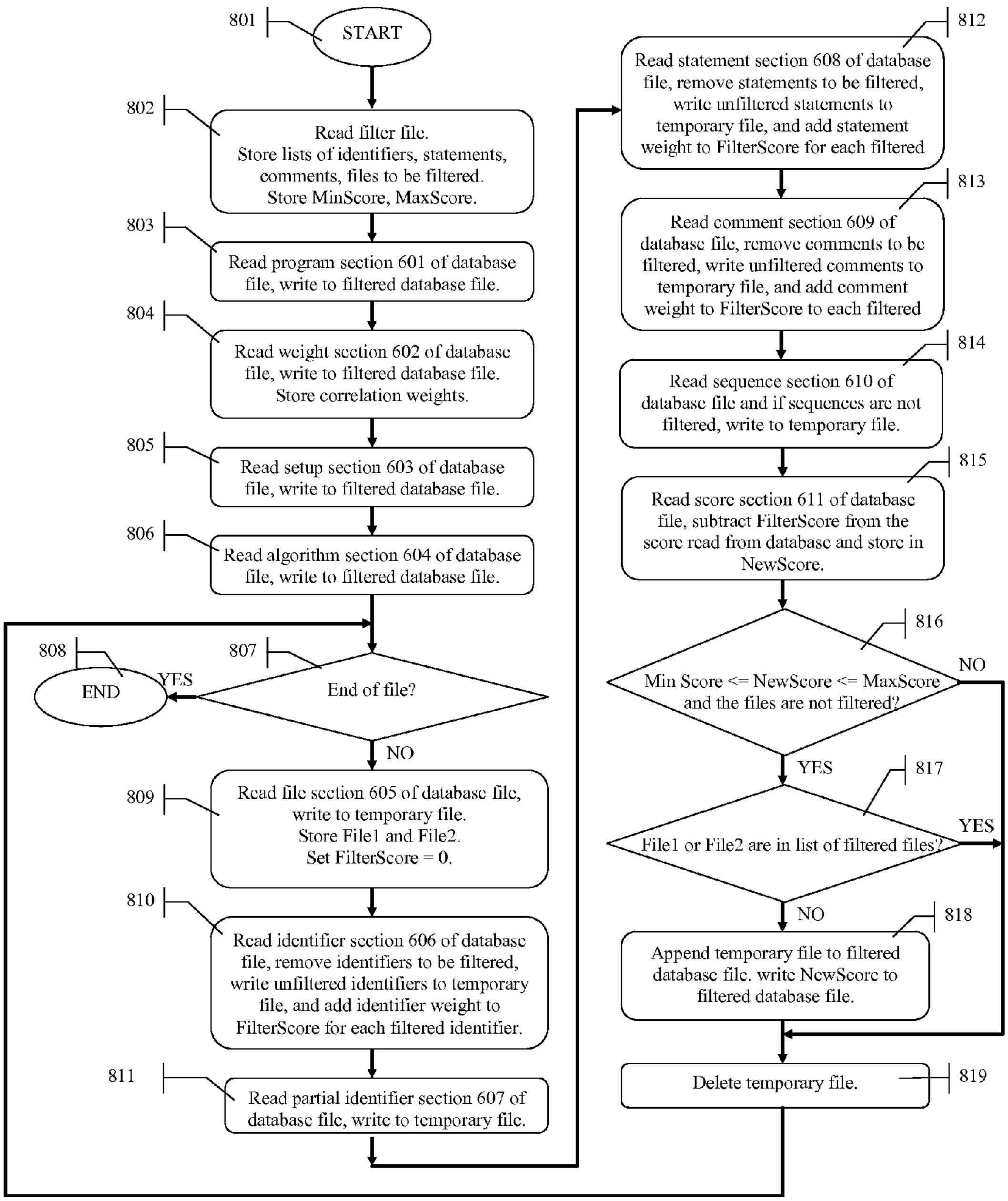
FIG. 8 illustrates a process for filtering a correlation database.

FIG. 8 shows a process for filtering a correlation database. The process begins at step 801 and continues to step 802 where the filter file is read. The identifiers, statements, comments, and files to be filtered are stored in lists. The minimum and maximum correlation scores to be filtered are also read from the filter file and stored in variables MinScore and MaxScore respectively. If no minimum correlation score is specified in the filter file then MinScore is set to the absolute minimum correlation value of 0. If no maximum correlation score is specified in the filter file then MaxScore is set to the absolute maximum correlation score possible.

The process continues to step 803 where the program section 601 of the correlation database file is read. Because section 601 contains general information, it is simply copied to the filtered correlation database file—there is no information in this section to filter out.

The process continues to step 804 where the weight section 602 of the correlation database is read. Section 602 is written to the filtered correlation database file and the weights are stored in variables.

The process continues to step 805 where the setup section 603 of the correlation database file is read and written to the filtered correlation database file.

The process continues to step 806 where the algorithm section 604 of the correlation database file is read and written to the filtered correlation database file.

The process continues to step 807 where the correlation database is tested for an end-of-file condition (EOF). If an EOF is found, the filtering process is complete, the filtered correlation database file has been written, and the process goes to step 808 where is terminates. If an EOF is not found, the process continues to step 809 where the file section 605 of the correlation database file is read and written to a temporary file. In this step the variable FilterScore is set to 0 and the filtering process begins for the pair of correlated source code files specified in the correlation database file. The full path names of the two source code files specified in the correlation database file are stored in variables File1 and File2.

The process continues to step 810 where the identifier section 606 of the correlation database file is read. Each identifier is compared to the list of filtered identifiers. Each identifier that is not found in the list is written to the temporary file. If an identifier is found on the list, it is not written to the temporary file and the value corresponding to the weight given to the identifier, as determined by the weight section 602 of the correlation database file that was read in step 804, is added to the variable FilterScore.

The process continues to step 811 where the partial identifier section 607 of the correlation database file is read and written to the temporary file. In this embodiment, partial identifiers are not filtered, though in other embodiments they can be filtered in a manner similar to the way that identifiers are filtered.

The process continues to step 812 where the statement section 608 of the correlation database file is read. Each statement is compared to the list of filtered statements. All statements not found in the list are written to the temporary file. If a statement is found on the list, it is not written to the temporary file and the value corresponding to the weight given to the statement, as determined by the weight section 602 of the correlation database file that was read in step 804, is added to the variable FilterScore.

The process continues to step 813 where the comment section 609 of the correlation database file is read. Each comment is compared to the list of filtered comments. All comments not found in the list are written to the temporary file. If a comment is found on the list, it is not written to the temporary file and the value corresponding to the weight given to the comment, as determined by the weight section 602 of the correlation database file that was read in step 804, is added to the variable FilterScore.

The process continues to step 814 where the instruction sequence section 610 of the correlation database file is read. If instruction sequences are not filtered out then this entire section is written to the temporary file.

The process continues to step 815 where the correlation score section 611 of the correlation database file is read. The correlation score for the particular file pair is read. The value of variable FilterScore is subtracted from the correlation score and stored in variable NewScore, representing the correlation score after the specified identifiers, statements, and comments have been filtered out.

The process continues to step 816 where NewScore is compared to MinScore and MaxScore. If NewScore falls within these two limits, inclusively, then the process continues to step 817. If NewScore does not fall within the two limits, inclusively, then the process skips steps 817 and 818 and proceeds to step 819.

At step 817 the list of filtered files is checked to determine whether File1 or File2 are in the list of filtered files. If not, then the process continues to step 818 where the temporary file is appended to the filtered correlation database file and NewScore is written to the filtered correlation database file as the correlation score in the correlation score section 611. The process then continues to step 819. If at step 817 File1 or File2 are in the list of filtered files, then the process skips step 818 and proceeds directly to step 819.

At step 819 the temporary file is deleted and the process proceeds to step 807 where the filtering process is repeated for another pair of files specified in the correlation database file until an EOF is reached.

FIG. 9 shows the correlation database file of FIG. 6 where the identifiers bit32, dump, image, program, nPlatformVersion, and IsWin95 have been filtered out. Sections 901 through 905 are identical to the original correlation database file sections 601 through 605 in FIG. 6. Sections 907 through 910 are identical to the original correlation database file sections 607 through 610 in FIG. 6. Section 906 differs from original section 606 in that the filtered identifiers are missing. Section 911 differs from original section 611 in that the correlation score has been reduced by the weights for the identifiers that have been filtered out.

FIG. 10 shows the correlation database file of FIG. 6 where the following statements have been filtered out:

```
#include <Assert.h>
#include <RegStr.h>
#include <Stdio.h>
#include <TChar.h>
p = null;
PW32N_ADAPTER_INFO pAdapterInfo,
```

Sections 1001 through 1007 are identical to the original correlation database file sections 601 through 607 in FIG. 6. Sections 1009 through 1010 are identical to the original correlation database file sections 609 through 610 in FIG. 6. Section 1008 differs from original section 608 in that the filtered statements are missing. Section 1011 differs from original section 611 in that the correlation score has been reduced by the weights for the statements that have been filtered out.

FIG. 11 shows the correlation database file of FIG. 6 where the following comments have been filtered out:

```
#include "WiNDIS.h"
* Copyright (c) 1992, 1993, 1994, 1995, 1996
* THIS SOFTWARE IS PROVIDED AS IS
>printf("%u %u %u %u\n", insn->code,
```

Sections 1101 through 1108 are identical to the original correlation database file sections 601 through 608 in FIG. 6. Section 1110 is identical to the original correlation database file section 610 in FIG. 6. Section 1109 differs from original section 609 in that the filtered comments are missing. Section 1111 differs from original section 611 in that the correlation score has been reduced by the weights for the comments that have been filtered out.

FIG. 12 shows the correlation database file of FIG. 6 where the instruction sequences have been filtered out. Sections 1201 through 1209 are identical to the original correlation database file sections 601 through 609 in FIG. 6. Section 1210 is identical to the original correlation database file section 611 in FIG. 6. Section 610 of the original correlation database file has been entirely filtered out of the filtered correlation database file.

Various modifications and adaptations of the embodiment that is described here would be apparent to those skilled in the art based on the above disclosure. Many variations and modifications within the scope of the invention are therefore possible. The present invention is set forth by the following claims.

I claim:

1. A method comprising comparing, by a processing device, a set of source code files to compute an initial correlation score, the comparing comprising performing a plurality of plagiarism detection tests based on correlating a plurality of course code elements from the set of source code files and combining results of the plurality of plagiarism detection tests to compute the initial correlation score;

writing, to a first data store, the plurality of correlated source code elements, the initial correlation score, and data indicative of contributions of the plurality of correlated source code elements to the initial correlation score;

writing, to a second data store, a first source code element of the plurality of correlated source code elements that is not specified to be filtered by one or more filters, wherein a second source code element of the plurality of correlated source code elements that is specified to be filtered by the one or more filters is not written to the second data store;

determining, by the processing device, without re-comparing the set of source code files, a contribution of the second source code element to the correlation score based on the data indicative of the contributions of the plurality of correlated source code elements to the initial correlation score;

determining, without re-comparing the set of source code files, a new correlation score based on deducting the determined contribution of the second source code element from said initial correlation score; and writing said new correlation score to said second data store.

2. The method of claim 1) wherein the second source code element is at least one of a statement, a comment, an identifier, or an instruction sequence.

3. The method of claim 1) wherein the second source code element is a partial identifier.

4. The method of claim 1) further comprising:

specifying the second source code element to be filtered based on finding said second source code element in a list of source code elements to be filtered.

5. The method of claim 4) wherein the second source code element comprises at least one of a statement, a comment, or an instruction sequence.

6. The method of claim 4) wherein the second source code element comprises at least one of an identifier or a partial identifier.

7. The method of claim 1, wherein the first data store is a first correlation database comprising a separate entry for each of the plurality of source code elements.

8. The method of claim 1, wherein comparing the set of source code files further comprises:

each of the plurality of plagiarism detection tests outputting an intermediate score based on the plurality of correlated source code elements.

9. An apparatus comprising a memory; and a processor, coupled to the memory, to:

compare a set of source code files to compute an initial correlation score, the comparing comprising performing a plurality of plagiarism detection tests based on correlating a plurality of source code elements from the set of source code files and combining results of the plurality of plagiarism detection tests compute the initial correlation score;

write, to a first data store, the plurality of correlated source code elements, the initial correlation score, and data indicative of contributions of the plurality of correlated source code elements to the initial correlation score;

write, to a second data store, a first source code element of the plurality of correlated source code elements that is specified to be filtered by the one or more filters, wherein a second source code element of the plurality of correlated source code elements that is specified to be filtered by the one or more filters is not written to the second data store;

determine a contribution of the second source code element to the correlation score based on the data indicative of the contributions of the plurality of correlated source code elements to the initial correlation score;

determine, without re-computing the set of source code files, a new correlation score based on deducting the determined contribution of the second source code element from said initial correlation score; and write said new correlation score to said second data store.

10. The apparatus of claim 9) wherein the second source code element comprises at least one of a statement, a comment, and identifier, or an instruction sequence.

11. The apparatus of claim 9) wherein the second source code element is a partial identifier.

12. The apparatus of claim 9) wherein the processor is further to:

specify the second source code element to be filtered based on finding said second source code element in a list of source code elements to be filtered.

13. The apparatus of claim 12) wherein the second source code element comprises at least one of a statement, a comment, or an instruction sequence.

14. The apparatus of claim 12) wherein the second source code element comprises at least one of an identifier or a partial identifier.

15. The apparatus of claim 9, wherein the first data store is a first correlation database comprising a separate entry for each of the plurality of source code elements.

16. The apparatus of claim 9, wherein each of the plurality of plagiarism detection tests results in an intermediate score based on the plurality of correlated source code elements.

17. A non-transitory computer readable medium including instructions that, when executed by a processing device, cause the processing device to perform a method comprising:

comparing, by the processing device, a set of source code files to compute an initial correlation score, the comparing comprising performing a plurality of plagiarism detection tests based on correlating a plurality of source code elements from the set of source code files and combining results of the plurality of plagiarism detection tests to compute the initial correlation score;

writing, to a first data store, the plurality of correlated source code elements, the initial correlation score, and data indicative of contributions of the plurality of correlated source code elements to the initial correlation score;

writing, to a second data store, a first source code element of the plurality of correlated source code elements that is not specified to be filtered by one or more filters, wherein a second source code element of the plurality of correlated source code elements that is specified to be filtered by the one or more filters is not written to the second correlation database;

determining, by the processing device, a contribution of the second source code element to the correlation score based on the data indicative of the contributions of the plurality of correlated source code elements to the initial correlation score;

determining, without re-computing the set of source code files, a new correlation score based on deducting the determined contribution of the second source code element from said correlation score; and writing said correlation score to said second data store.

18. The non-transitory computer readable medium of claim 17) wherein the second source code element comprises at least one of a statement, a comment, an identifier, a partial identifier or an instruction sequence.

19. The non-transitory computer readable medium of claim 17) further comprising:

specifying the second source code element to be filtered based on finding said second source code element in a list of source code elements to be filtered.

20. The non-transitory computer readable medium of claim 19) wherein the second source code element comprises at least one of a statement, a comment, an identifier, a partial identifier or an instruction sequence.

21. The non-transitory computer readable medium of claim 17, wherein the first data is a first correlation database comprising a separate entry for each of the plurality of source code elements.

22. The non-transitory computer readable medium of claim 17, wherein comparing the set of source code files further comprises:

each of the plurality of plagiarism detection tests outputting an intermediate score based on the plurality of correlated source code elements.

* * * * *